(12) United States Patent
Lamm

(10) Patent No.: US 8,865,369 B2
(45) Date of Patent: Oct. 21, 2014

(54) APPARATUS FOR RECIRCULATION OF ANODE EXHAUST GASES OF A FUEL CELL

(75) Inventor: Arnold Lamm, Elchingen (DE)

(73) Assignee: Daimler AG, Stuttgart (DE)

( * ) Notice: Subject to any disclaimer, the term of this patent is extended or adjusted under 35 U.S.C. 154(b) by 971 days.

(21) Appl. No.: 12/377,163

(22) PCT Filed: Aug. 6, 2007

(86) PCT No.: PCT/EP2007/006916
§ 371 (c)(1),
(2), (4) Date: Feb. 11, 2009

(87) PCT Pub. No.: WO2008/019771
PCT Pub. Date: Feb. 21, 2008

(65) Prior Publication Data
US 2010/0178591 A1    Jul. 15, 2010

(30) Foreign Application Priority Data

Aug. 12, 2006   (DE) .................. 10 2006 037 799

(51) Int. Cl.
*H01M 8/04* (2006.01)
(52) U.S. Cl.
CPC ...... *H01M 8/04097* (2013.01); *H01M 2250/20* (2013.01); *H01M 8/04231* (2013.01); *Y02E 60/50* (2013.01); *Y02T 90/32* (2013.01)
USPC .......................................... 429/512; 429/513
(58) Field of Classification Search
USPC ................................... 429/34, 512
IPC ......................................................... H01M 8/04
See application file for complete search history.

(56) References Cited

U.S. PATENT DOCUMENTS

| | | | |
|---|---|---|---|
| 6,800,390 B2 * | 10/2004 | Kashiwagi | 429/415 |
| 2002/0136942 A1 | 9/2002 | Kashiwagi | |
| 2003/0148167 A1 * | 8/2003 | Sugawara et al. | 429/34 |
| 2003/0217773 A1 | 11/2003 | Yamada et al. | |
| 2004/0219406 A1 | 11/2004 | Sugawara et al. | |
| 2005/0064255 A1 | 3/2005 | Blaszczyk et al. | |
| 2005/0130008 A1 * | 6/2005 | Uozumi | 429/34 |
| 2006/0073363 A1 | 4/2006 | Taniguchi et al. | |

FOREIGN PATENT DOCUMENTS

| | | |
|---|---|---|
| DE | 10251878 A1 | 7/2003 |
| WO | 2004038838 A2 | 5/2004 |

* cited by examiner

Primary Examiner — Ula C Ruddock
Assistant Examiner — Daniel Gatewood
(74) *Attorney, Agent, or Firm* — Patent Central LLC; Stephan A. Pendorf

(57) ABSTRACT

An apparatus is used for the recirculation of anode exhaust gases of a fuel cell, with a recirculation blower and at least one jet pump operated by a propulsion gas stream. The propelling medium is in this case a pressurized fuel, for example hydrogen. The anode outlet of the fuel cell is connected to the intake connection of the at least one jet pump. The outlet of the at least one jet pump is then connected to both the anode inlet and the intake connection of the recirculation blower. The output of the recirculation blower can be connected to the intake connection of the at least one jet pump.

6 Claims, 1 Drawing Sheet

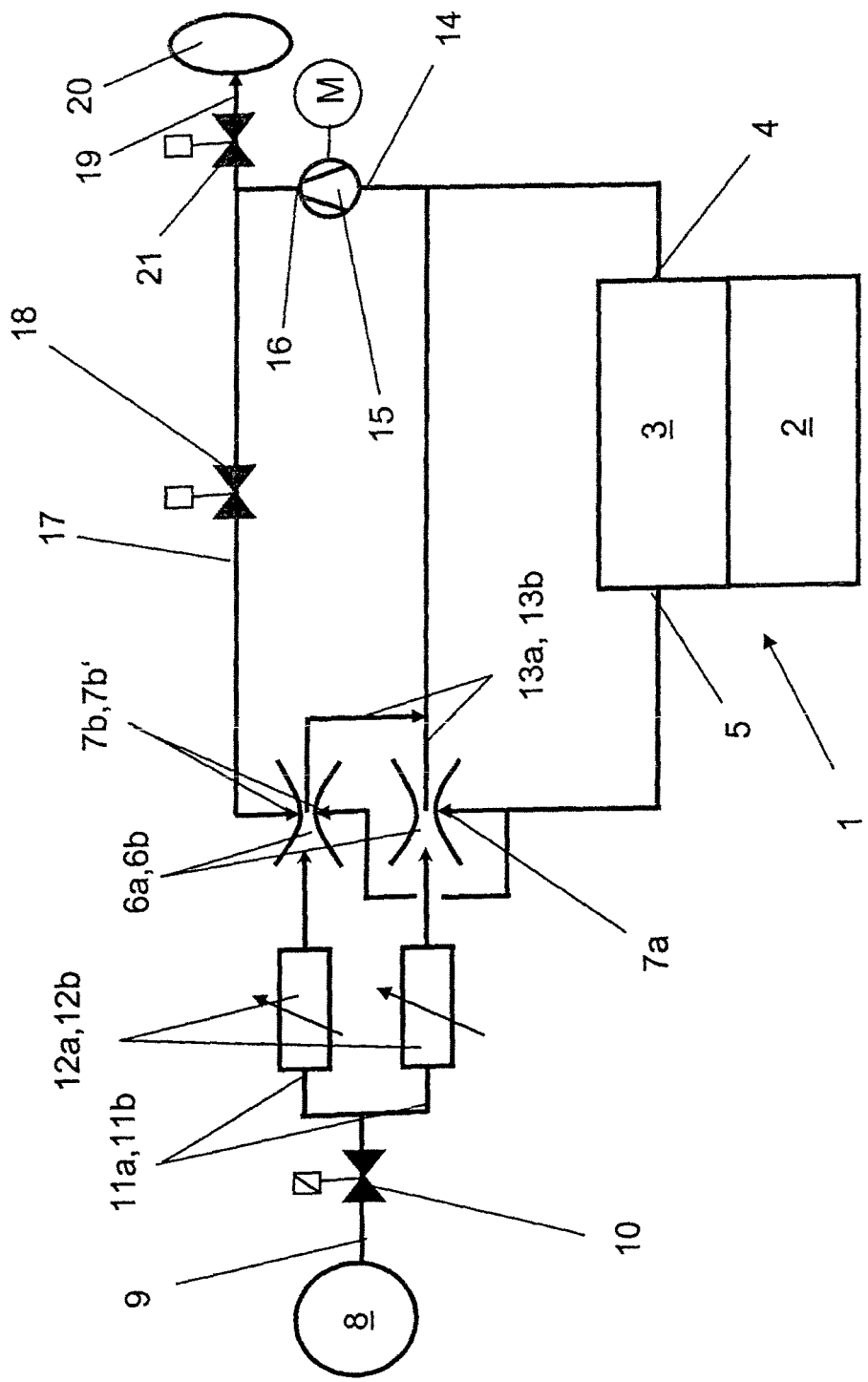

APPARATUS FOR RECIRCULATION OF ANODE EXHAUST GASES OF A FUEL CELL

The invention concerns a device for recirculation of anode exhaust gases of a fuel cell, with a recirculation blower and at least one jet pump.

This type of device is known in the state of the art and is disclosed, for example, in DE 102 51 878 A1, or the basically equivalent U.S. Pat. No. 6,800,390. Both cases involve the combination of a jet pump or ejector with a recirculation blower provided upstream with respect to the direction of flow of the exhaust gas. This blower moves a comparatively large flow volume, namely, the total recirculated exhaust gas. Therewith the blower requires a comparatively large amount of construction space. Further, it has a high electrical power consumption which, as a parasitic load, reduces the practical overall efficiency of the fuel cell system.

It is the task of the invention to minimize these disadvantages and to provide an energy-saving, highly flexible device for anodic recirculation in a fuel cell system.

In accordance with the invention this task is solved by the characteristics set forth in the characterizing portion of claim 1.

This design makes possible the employment of a very small, compact, comparatively low power recirculation blower. This can thus be, for example, a very economical 12 volt blower. Therewith, the arrangement according to claim 1 already allows a targeted utilization of an economical and space-saving active recirculation.

Particularly advantageous therein is the further development of the invention with at least two parallel jet pumps or ejectors according to claim 2.

Thereby ideal configurations with one or two jet pumps and/or the blower are made possible for various load conditions. Therewith for all conceivable load considerations a suitable configuration can be selected, in order to make considerations a suitable configuration can be selected, in order to make possible the targeted utilization of the economical and space saving active recirculation in various load conditions.

A further advantageous embodiment of the invention according to claim 3 makes it possible to connect the exit of the recirculation blower as needed with a supplemental exhaust gas space.

An exhaust gas space of this type can be, for example, the environment surrounding the fuel cell system, or also a suitable space, in which potentially developed exhaust gases can be converted into non-hazardous components by, for example, a catalytic converter. The configurablity according to the invention makes possible therewith the very rapid transfer of the unwanted gas, for example during purging, or also the total content of the anode circulation, for example, in case of damage, since the recirculation blower actively conveys the gases in the area of such an exhaust gas space.

Particularly in the preferred case of employment of the device in a fuel cell system for motor vehicles, all the above mentioned advantages are of considerable importance. Energy efficiency and compact construction are therein just as important as an optimal adaptation to the very high and very dynamic changes in load which are typical of motor vehicles. Further, the safety aspect naturally plays a particularly important role in motor vehicles, since persons and systems are combined in a narrow space, and since with motor vehicles a high risk of accidents by external influences is to be expected.

Further advantageous embodiments can be seen from the remainder of the dependent claims and are described in greater detail on the basis of the FIGURE.

There is shown in:

FIG. 1 a schematic representation of a possible embodiment of the inventive device.

In FIG. 1 a fuel cell 1 is schematically shown. The fuel cell 1 is comprised of a cathode space 2 and an anode space 3, which are separated from each other for example by a proton conductive membrane. For the further explanation of the invention, essentially only the area of the anode space 3 is of interest, so that in the following the cathode space 2 will not be discussed in greater detail. In the area of the cathode space 2 however various conventional components for supplying the cathode space 2 with oxygen containing medium, for example humidified air, as well as for conveying away the exhaust gas of the cathode space 2 can be provided.

The supply of the fuel used for the fuel cell 1, for example hydrogen, occurs via the anode inlet 4 in the area of the anode space 3. Unused fuel passes via the anode exit 5 from the anode space 3 into the area of two jet pumps 6a, 6b. These two jet pumps 6a, 6b—basically it would be possible to employ in this place also only a single jet pump—are thus associated with the anode exit 5, such that the gas originating from the anode space 3 accesses the suction connections 7a, 7b respectively of the two jet pumps 6a, 6b.

The two jet pumps 6a, 6b, which typically are referred to as ejectors, jet pumps, or the like, operate therein according to the principal of a Venturi eductor, in which the velocity of flow of the drive stream increases due to reduction in cross-section, and therewith suctions a second stream flow in the area of the constriction. In the design shown here, the two jet pumps 6a, 6b are driven by a drive medium, which originates from a storage device 8. In a preferred operation of the fuel cell 1 with hydrogen this storage device 8 can in particular be a pressure tank, in which the hydrogen is stored under high pressure as fuel. Typically, the pressures in the magnitude of 200 to 800 bar are conventional. The hydrogen under pressure is conveyed out of the storage device 8 via a supply line 9 typically leading to a pressure regulator 10 following a here not shown switchable valve or the like. After the pressure regulator 10, the flow of the drive stream reaches, in the here illustrated embodiment, via two branches 11a, 11b, the respective jet pumps 6a, 6b.

In the above already mentioned case of a single jet pump, obviously the branching can be omitted.

In both branches 11a, 11b further metering devices 12a, 12b are provided, which appropriately dispense the amount of fuel conveyed to the respective jet pumps 6a, 6b by means of the drive stream. Via this metering, thus, either the one or the other of the two jet pumps 6a, 6b can be operated with the required volumetric flow. By this parallel arrangement of the two jet pumps 6a, 6b and the rejoined outlet 13a, 13b of the two jet pumps 6a, 6b, exhaust gas originating from the anode space 3 can be mixed with the new fuel and returned back to the anode inlet 4. Due to the two parallel-arranged jet pumps 6a, 6b and the drive stream supplied via the metering device 12a, 12b it is possible to adjust for the supplied amount of fuel as well as the amount of the recirculated exhaust gas according to the load change specified requirements of the fuel cell 1.

The here illustrated design includes, besides this parallel arrangement of two jet pumps 6a, 6b, a branching of the recombined recirculation volume. Thus, the rejoined or recombined exhaust passages 13a, 13b of the two jet pumps 6a, 6b are, on the one hand, connected with the anode inlet 4, and, on the other hand, with the suction connection 14 of a recirculation blower 15. The recirculation blower 15 can be driven as required, typically via an electric motor. The outlet 16 thereof is therein connected via a connection line 17 with a suction connection 7b' of one of the jet pumps 6b. The connection line 17 further includes a magnet valve 18, by means of which the cross-section of the connection line can be opened or closed. Via the magnet valve 18 the outlet 16 of the recirculation blower 15 can thus, as necessary, be connected with the suction connection 7b' of the one jet pump 6b. In addition, the outlet 16 of the recirculation blower 15 can be connected with the exhaust gas space 20 via a further connection 19. Also, this connection 19 can be opened or closed in its flow-through cross-section by means of a magnet valve 21. Besides magnet valves, other suitable blocking valves are also conceivable which permit an automatic operation. The term "exhaust gas space 20" is to be understood, as already explained in the background section, to refer to either the environment of the fuel cell system directly, or a space in which, for example, via catalytic converters, the gases potentially contained in the exhaust gas or gas mixtures are decomposed and/or diluted to a safe proportion.

The respiration of the recirculation blower 15 at the above described location makes it possible to actuate this for active recirculation of the anode exhaust gas only when immediately required. Together with the two parallel arranged and, via their metering device 12a, 12b separately driveable, jet pumps 6a, 6b, it becomes possible to adjust suitable recirculation flow or volumes for the respective load conditions of the fuel cell via the two jet pumps 6a, 6b initially passively and, as required for active support, by means of recirculation blower. Therewith, with a small compact recirculation blower 15—for example in the form of an economical 12 volt fan—an active and very good adaptation to the respective existing load conditions of the fuel cell 1 occur. In contrast to the state of the art, for the "primary" drive of the anode recirculation, the pressure of the fuel which already exists in the storage device 8 is used by the two jet pumps. The recirculation blower 15 is engaged selectively and only as required. The electrical power required for driving thereof can thus be minimized.

The inventive design in FIG. 1 provides, beyond this, various possibilities to utilize the recirculation blower to support evacuating the anode space, for example upon switching off of the fuel cell or upon occurrence of an accident, which necessitates an emptying of hydrogen located in the system. In comparison to the conventional systems, in which the evacuation or purging occurs essentially via the pressure within the anode circulation and the anode space 3, here an active evacuation can occur via the recirculation blower 15 when the magnet valve 21 leading to the exhaust gas space 20 is opened.

Such an evacuation can be useful not only during the above mentioned emergency conditions but also during turning off of the system, since here, by the ventilation/degassing by means of the recirculation blower 15, an empty and, in particular, dry, fuel cell system is fostered, which upon renewed starting has known corresponding advantages, and which typically no longer freezes at temperatures below the freezing point.

The described design thus makes it possible to have a very flexible utilization during operation as well as in case of emergency, and as well as during starting or as the case may be turning off of the operation, by a suitable combination of actuation or not actuation of recirculation blower 15 and/or respectively turned on jet pumps 6a, 6b as well as appropriately opened magnet valves 18, 21. In particular, in the case of high dynamic requirements amplified by temperature and load changes, which occur in fuel cell systems in motor vehicles, significant advantages can be achieved by the design according to the invention.

The invention claimed is:

1. A device for recirculation of anode exhaust gases of a fuel cell with a recirculation blower (15) and at least one jet pump driven by the drive stream of a fuel which is under pressure,
   wherein the fuel cell (1) includes an anode space (3) with an anode inlet (4) and an anode outlet (5),
   wherein the anode outlet (5) is connected with a suction connection (7a, 7b) of at least one jet pump (6a, 6b) having an inlet and an outlet,
   and wherein
   in a first flow loop the outlet (13a, 13b) of the at least one jet pump (6a, 6b) is connected with the anode inlet (4) and
   in a second flow loop the outlet (13a, 13b) of the at least one jet pump (6a, 6b) branches from the first flow loop at a "T" connection and thereafter is connected with the suction connection (14) of the recirculation blower (15), wherein the outlet (16) of the recirculation blower (15) is connectable with a suction connection (7b') of the at least one jet pump (6a, 6b) bypassing the anode space (3) and connectable with a supplemental exhaust gas space (20) in which gasses are (a) decomposed or diluted or (b) exhausted to the environment.

2. The device according to claim 1, comprising at least 2 parallel jet pumps (6a, 6b) with rejoined outlets (13a, 13b) in place of the at least one jet pump, wherein the anode outlet (5) is connected with a suction connection (7a, 7b) of each of the jet pumps (6a, 6b), and wherein the outlet (16) of the recirculation blower (15) is connectable with a suction connection (7b') of one of the jet pumps (6b).

3. The device according to claim 1, wherein the connectable connections (17, 19) between recirculation blower (15) and jet pump and between recirculation blower (15) and supplemental exhaust gas space (20) are embodied as conduits, which respectively include a magnet valve (18, 21) for unblocking and/or blocking an opening cross-section thereof.

4. The device according to claim 1, wherein the flow guidance for the drive stream of the at least one jet pump (6a, 6b) includes a metering device (12, 12b) upstream of the jet pump (6a, 6b).

5. A device for recirculation of anode exhaust gases of a fuel cell with a recirculation blower (15) and at least at least two jet pumps (6a, 6b) driven by the drive stream of a fuel which is under pressure,
   wherein fuel under pressure is delivered to the at least two jet pumps (6a, 6b) via a branched flow conduit, wherein each of the branches (11a, 11b) includes a metering device (12, 12b), which dispense the amount of fuel conveyed to the respective jet pumps 6a, 6b by metering of the drive stream,
   wherein the fuel cell (1) includes an anode space (3) with an anode inlet (4) and an anode outlet (5),
   wherein the anode outlet (5) is connected with a suction connection (7a, 7b) of at least two jet pumps (6a, 6b) having an inlet and an outlet,
   and wherein
   in a first flow loop the outlet (13a, 13b) of the at least one jet pump (6a, 6b) is connected with the anode inlet (4) and
   in a second flow loop the outlet (13a, 13b) of the at least one jet pump (6a, 6b) branches from the first flow loop at a "T" connection and thereafter is connected with the suction connection (14) of the recirculation blower (15), wherein the outlet (16) of the recirculation blower (15) is connectable with a suction connection (7b') of the at least one jet pump (6a, 6b) bypassing the anode space (3) and connectable with a supplemental exhaust gas space (20) in which gasses are (a) decomposed or diluted or (b) exhausted to the environment.

6. The device according to claim 1, wherein hydrogen under high pressure is used as the fuel, and wherein the hydrogen supply line to the at least one jet pump (6a, 6b) includes at least one pressure regulator (10).

* * * * *